United States Patent Office 3,529,034
Patented Sept. 15, 1970

3,529,034
ONE-PART LONG-SHELF-LIFE EPOXY-BASED
COMPOSITIONS
Gaylord L. Groff, North St. Paul, Minn., assignor to Minnesota Mining and Manufacturing Company, St. Paul, Minn., a corporation of Delaware
No Drawing. Filed Feb. 11, 1969, Ser. No. 798,452
Int. Cl. C08g 45/14, 47/10
U.S. Cl. 260—824        10 Claims

ABSTRACT OF THE DISCLOSURE

One-part compositions that have a long shelf-life and are curable to a tough, flexible product having good properties as high-temperature electrical insulation are prepared from certain epoxy-terminated polyesters and aromatic or cyclic polyfunctional carboxylic acids having at least three functional carboxyl groups.

BACKGROUND OF THE INVENTION

Until this invention, there have been no completely satisfactory one-part, epoxy-based, electrical insulating resin compositions curable to a tough, flexible state and useful at rather high temperatures (155° C.). One-part compositions are strongly preferred, since the use of two separate packages makes the composition more cumbersome to apply and requires a high degree of uniformity in the methods of mixing and applying the compositions and in the temperatures of cure. However, previously known one-part compositions that gave the best cured properties generally have had a shelf-life that was inadequate for most commercial uses. On the other hand the best known one-part compositions having an adequate shelf-life have produced poorly cured products that are deficient in flexibility and toughness. In addition, their inadequate curing has caused them to exhibit poor hydrolytic resistance, so that in use in places of high humidity and high temperature the composition degraded.

SUMMARY OF THE INVENTION

The present invention provides a one-part long-shelf-life composition that cures to a tough, flexible composition useful at high temperatures. These compositions principally comprise an epoxy-terminated polyester and an aromatic or cyclic polycarboxylic acid curing agent.

The epoxy-terminated polyesters used generally comprise a low-molecular-weight substantially completely reacted adduct of (1) a carboxyl-terminated polyester having the formula

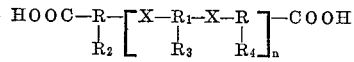

in which X is an ester group; R and $R_1$ are selected from hydrocarbon groups, hydrocarbon groups having ether linkages, and hydrocarbon groups substituted with sulfone, sulfide, phosphonate, phosphine oxide, silane, and siloxane groups, and combinations of them; $R_2$ is selected from hydrocarbon groups, carboxyl, hydrogen, and halogen and combinations of them; $R_3$ is selected from hydrocarbon groups, hydrogen, halogen, and X—R—COOH groups (where R and X have the above assigned designations), and combinations of them; and $R_4$ is selected from hydrocarbon groups, hydrogen, and halogen, and combinations of them; and $n$ is at least one; and (2) an epoxy compound containing on the average at least about 1.3 oxirane groups per molecule, the epoxy compound being present in the amount of at least two epoxide equivalent weights for each carboxyl equivalent weight of acid-terminated polymer present.

The aromatic or cyclic polycarboxylic acids used as a curing agent for this epoxy-terminated polyester in compositions of the invention have at least three functional groups and generally have melting points above 125° C. While polycarboxylic acids have previously been suggested as curing agents for epoxy resins, insofar as is known, no one has previously discovered the highly useful properties that can be obtained by using the particular high-melting aromatic or cyclic polycarboxylic acids of this invention in combination with epoxy-terminated polyesters. As previously noted, when mixed with epoxy-terminated polyesters, these polycarboxylic acids produce the first known satisfactory insulating composition that has a long shelf-life and that cures to a tough, flexible state useful at 155° C. and above. The cured product exhibits good electrical properties and very good hydrolytic resistance, and as a result, in paste form, the composition has important uses as an encapsulating material for electric machinery parts and other electrical apparatus. Because of their flexibility they may be used to provide insulating coatings on wires that can be twisted and bent without rupture of the insulative coating. In addition, the composition can be formed into a cured film useful as a tape backing. In another use, the paste is used as an adhesive.

DETAILED DESCRIPTION

The acid-terminated polyesters used in making the epoxy-terminated polyester of compositions of this invention may be aliphatic, aromatic, cycoaliphatic or of mixed structure, and they may have ethylenic unsaturation and may be branched. These acid-terminated polyesters are usually produced by the reaction of polybasic, usually dibasic, acids with polyols, using the acid in excess. Alternatively, cyclic anhydrides are reacted with polyhydroxy compounds. Also having utility are polyesters prepared by the reaction of bisphenol diacetates with an excess of polybasic acids. The acid-terminated polyesters have been found to be especially useful in resinous products having high heat resistance.

The molecular weight of the acid-terminated polyester should exceed 250 and preferably 500 to achieve cured flexible products. If the polymer exceeds a molecular weight of 10,000, an epoxy-terminated polyester that is relatively slower in curing will result, and the molecular weight of the acid-terminated polyester is preferably less than 5,000. The polymer should have an acid content between about 0.3 and 8 milliequivalents per gram. Acid-terminated polyesters having an average of 2 or 3 carboxyl groups per molecule are the most practical for use in this invention, but polyesters with a higher number of carboxyl groups are also used. To reduce premature gelation during reaction of acid-terminated polyesters of high carboxyl content with an epoxy compound, a relatively large excess of epoxy compound is used.

The epoxy component of epoxy-terminated polymers of this invention should average at least 1.3 oxirane groups per molecule to achieve epoxy termination. It is preferred, however, that the epoxy compound have not much more than two epoxy groups per molecule on the average to prevent undue interreaction and even curing during the reaction of the epoxy resin with the acid-terminated polymer. Examples of useful epoxy resins are the liquid or solid diglycidyl ethers of polyhydric phenols such as resorcinol or bisphenol. Other useful epoxy resins include aliphatic diepoxides and cycloaliphatic diepoxides.

In preparing epoxy-terminated adducts, at least two epoxide equivalent weights of epoxy compounds are mixed with one carboxyl equivalent weight of acid-terminated compounds to give an epoxy-terminated polyester.

Higher ratios of oxirane groups to carboxyl groups, up to 10 to 1, are also used, as where the resulting adduct is to be used to provide final cured products of less flexibility; in such adducts the molecular weight of the polyester should generally be substantially higher than 500, as 1000 or 1500.

The relative molecular weights of the carboxyl-terminated polyester and epoxy resin components are also controlled to effect changes in the properties of the reacted adduct. To increase the flexibility of the product, longer carboxyl polymer molecules and shorter epoxy resin molecules are called for. To decrease flexibility, longer epoxy molecules, usually with aromatic groups, and shorter polymer molecules, are used. For preparation of cured products of high flexibility or rubbery character, it is preferred that the structure of the carboxyl polymer molecule be prepared from monomer units that are largely aliphatic. However, flexibility as well as gool high-temperature resistance can be obtained from polymer structures that are largely aromatic by employing higher molecular weight polymer molecules.

The reaction of acid-terminated polyester with excess epoxy compound may be performed satisfactorily at temperatures varying within about 50°–220° C. Inert diluents or solvents may be employed to reduce the viscosity of the product during reaction or are added at the conclusion of the reaction for liquid coating purposes. The reaction is conveniently carried out at atmospheric pressure although pressures both above and below atmospheric can be employed. If high reaction temperatures are employed, it is generally desirable to exclude air during the reaction through use of an inert atmosphere such as nitrogen. Completion of the reaction to form the epoxy-terminated prepolymer or adduct product is conveniently indicated by measuring the acid number of the reaction mixture, which should preferably reach less than one.

Catalysts useful for the reaction of the acid-terminated polyester and epoxy compound include tertiary amines and the salts thereof, quaternary amines, alkali metal alcoholates, alkali metal phenolates, alkali metal hydroxides, alkali metal salts of organic acids and alkali metal salts of inorganic acids. Examples of such catalysts are tris (2,4,6 - dimethylaminomethyl)phenol (DMP–30), sodium methoxide, potassium phenolate, and lithium hydroxide. Particularly preferred catalysts are the essentially neutral alkali metal salts of organic and inorganic acids such as potassium acetate or sodium chloride. Adducts prepared using these preferred catalysts are stable over long periods of aging, even at elevatel temperatures, whereas the less preferred catalysts that are alkaline or acidic tend to cause further reaction under such conditions leading to viscosity increases and ultimately to gelatin. It has been found that some commercially available epoxy resins have sufficient quantities of sodium chloride retained from their manufacturing processes to effectively catalyze their reaction with acid-terminated polymers without additional catalyst. Residual sodium chloride salt contents as low as 30 parts/million (based on alkali metal analysis) have shown useful catalytic effects on epoxy-acid polymer adduct formation.

As previously mentioned, the above-described epoxy-terminated polyester is blended with an aromatic or cyclic polycarboxylic acid having at least three functional carboxyl groups to give a one-part curable composition which is ready to use. It may be noted that, although anhydrides have been used to cure epoxy resins, it was found that a one-part composition using polycarboxylic anhydrides did not have an adequate shelf life. It was at the time speculated that one-part systems employing a polycarboxylic acid hardener would have an even shorter shelf life as there was no anhydride ring which would have to be opened before the curing could take place. Surprisingly, the one-part compositions using an aromatic or cyclic polycarboxylic acid and epoxy-terminated polyester were found to have a substantially longer shelf life than the corresponding anhydride.

A variety of aromatic or cyclic polycarboxylic acids having at least three carboxyl functional groups are useful as curing agents in compositions of this invention. Among the useful acids are trimellitic acid, pyromellitic acil, benzophenone tetracarboxylic acid, trimesic acid, and 1,2,3,4 - cyclopentane tetracarboxylic acid. As indicated by these examples, the useful acids generally have little aliphatic structure. As previously noted, they preferably do not melt below at least 125° C., since the use of acids that melt below 125° C. results in compositions of poorer shelf-life. The acids are generally added to the epoxy-terminated polyester in a proportion of between 0.5 and 1.5 carboxyl equivalent weights of acid to each epoxide equivalent weight of epoxy polymer; where a small amount of acid is used it is desirable to include a latent catalyst in the composition. An excess of over stoichiometry carboxyl groups is preferred, since in solid form the acids are less reactive.

For paste-like compositions, which are a major form of application for compositions of the invention, the epoxy-terminated polyester should be a liquid product so that when mixed with the powdered acid curing agent, a paste is formed. Solvents are preferably not used in pastes so as to avoid any possibility of bubbling or formation of voids during curing. Other compositions of the invention, useful to form tape backings, for example, may use room - temperature - solid epoxy - terminated polyesters in a solvent. Where a 100-percent-solids composition useful for dipping applications is desired, the epoxy-terminated polyester is generally quite low in viscosity so that the final composition will be quite low in viscosity.

The pastes of the invention are generally prepared by simply mixing the liquid epoxy-terminated polyester and powdered acid curing agent together, as on a paint mill, to form a thorough dispersion. The mixture may be slightly heated to aid processing. Often, a thixotropic agent that thickens the system and avoids separation of the acid and epoxy-terminated polyester is included in the composition, and a dye or pigment may also be added to impart various colors. The paste that is formed can be adequately cured at a temperature of 150° C. to a tough, rubbery product, such as a shell or coating encapsulating an electrical part.

The properties of the composition, such as viscosity, or the properties of the cured product, such as hardness and water- and heat-resistance may be varied by adding epoxy resins other than the described epoxy-terminated polyesters to the system. Diglycidyl ethers of bisphenol A are the most common epoxy compound used in this way, their amount generally not exceeding about 50 percent of the total epoxy compounds in the composition. Similarly, the curing reaction may be influenced by the addition of suitable catalytic agents. Inert materials, that is, talc, silica, etc., may also be added to alter the application properties or the final cured properties. Addition of such fillers also help reduce the cost of production.

The following non-limiting examples further illustrate the invention.

Example 1

A mixture of 567.4 grams (2.724 hydroxyl equivalent weights) of neopentyl glycol and 1125.9 grams (2.990 carboxyl equivalent weights) of azalaic acid was charged to a 3-liter 3-neck flask and gradually heated to a maximum temperature of 275° C. over a period of 6 hours while the water of condensation was removed. The last traces of water were removed by applying a vacuum (0.05 millimeter of mercury pressure) for a period of 3 hours. The product was found to have a carboxyl equivalent weight of 1095. To 1100.0 grams (1.00 carboxyl equivalent weights) of this polyester was mixed 357.8 grams (2.01 epoxide equivalent weights) of digylcidyl ether of bisphenol A (DER–332 LC) and 0.985 gram (0.01 ester-equivalent weight) of potassium acetate. The mixture was heated to 150° C. for 3½ hours at which point an acid number of zero was reached. The cooled reaction product (82.5 parts by weight of the epoxy-terminated polyester were used):

| Acid curing agent | Amount (parts by weight) | Gel time at 300° F. | Cure after 2½ hr. at 300° F. | Usable life at 150° F. |
|---|---|---|---|---|
| Pyromellitic acid | 3.81 | Less than 1 hr. | Tough, rubbery | Over 6 days. |
| Benzophenone tetracarboxylic acid. | 5.37 | ----do---- | ----do---- | Do. |
| Trimesic acid | 4.2 | ----do---- | ----do---- | Do. |
| 1,2,3,4-cyclopentane tetracarboxylic acid. | 3.72 | ----do---- | ----do---- | Do. | had an epoxide-equivalent weight of 1450 and was a viscous liquid of about 300,000 centipoises at 23° C.

This epoxy-terminated polyester and pulverized trimellitic acid were then mixed on a three-roll paint mill with other ingredients as listed below.

Parts
Epoxy-terminated polyester (epoxide equivalent weight 1450) _____ 100
Glycidyl ether ester of dimer acid (Epon 871; epoxide equivalent weight 450) _____ 7.5
Pulverized trimellitic acid (carboxyl equivalent weight 70) _____ 5.9
Modified Bentonite clay (commercially available as Bentone 38 from Ferro Company) _____ 12.0
Iron oxide red pigment supplied as Mapico Red 297 by National Lead Corp. _____ 1.5

The product obtained from the mill, which was scraped off into a container and cooled by circulating air, displayed a paste-like consistency. It was for example, easily applied as a coating on various objects with a wooden tongue depressor. After 21 days at 120° F. the paste was still usable and after 12 months at room temperature, its plasticity had not increased noticeably. For the sake of comparison, it may be noted that a one-part composition including the same epoxy-terminated polyester and trimellitic anhydride had a shelf life of around 2 days.

The gel time of the paste, using a hot plate, was 20 minutes at 155° C., 3.5 minutes at 170° C., and 1–2 minutes at 200° C. The material cured to a tough rubbery state after 1 hour at 155° C., but for better hydrolytic stability, the following cure schedule is recommended:

| Temperature, ° C. | Time, hours |
|---|---|
| 155 | 5–6 |
| 170–180 | 2 |
| 200 | 1 |

With cures according to this schedule, ⅛-inch sections of a ½-inch slab of cured rubber will withstand 10 days over water at 150° F. and only becoming slightly softer.

A sample of the paste pressed to a 20-mil-thick sheet in a cold press and subsequently cured in an oven exhibited the following properties:

Tensile strength—3600 pounds/square inch
Elongation at break—140%
Hardness—45 Shore A
Dielectric strength—500 volts/mil The paste of the invention was used to cover and seal leads of high voltage motor coils. After curing, the resin formed a tough, flexible coating on the leads. The coils were tested for insulation resistance by immersing them in a 5% salt solution. Resistance was measured at 500 volts D.C. and exhibited a resistance greater than $10^{10}$ ohms.

Examples 2–5

The epoxy-terminated polyester of Example 1 was mixed with four other finely powdered polyfunctional carboxylic acid curing agents on a paint mill as described above. The following table shows the acids used, the proportions and curing times, and the results obtained Again, for comparison, usable life at 150° F. when using pyromellitic dianhydride as a hardening agent for the same epoxy-terminated polyester was less than 8 hours, indicating a substantial increase in shelf life when using the corresponding acid.

Example 6

A mixture of 1135.8 grams (12.0 carboxyl equivalent weights) of azelaic acid, 374.9 grams (7.2 hydroxyl equivalent weights) of neopentyl glycol, and 1.2 grams (0.012 equivalent) of potassium acetate was charged to a 3-liter 3-neck flask and heated gradually to 220° C. while removing condensation water through a steam-heated, packed column. Xylene (20 cubic centimeters) was added to form an azeotrope with the last few percent of water. After removal of the solvent, a vacuum (10 millimeters of mercury pressure) was applied gradually and held at 220° C. for ½ hour. The vacuum was broken by purging the flask with nitrogen. The polyester obtained had a carboxyl equivalent weight of 286.

To 429.0 grams (1.5 carboxyl equivalent weights) of this carboxyl-terminated polyester was added 531.0 grams (3.0 epoxide equivalent weights) of diglycidyl ether of bisphenol A. This reaction mixture was heated to 130° C. and when an acid value of zero was obtained after 3 hours and 50 minutes the reaction was cooled down. The epoxide equivalent weight of this resin was 637.

This epoxy-terminated polyester was then mixed with 107.5 grams (1.2 carboxyl equivalent weights) of benzophenone tetracarboxylic acid powder in a metal container with a spatula until the product developed a paste-like consistency.

Upon application and curing, the product exhibited properties similar to those recited in Example 1, although it was somewhat stiffer and lower in elongation.

Example 7

A mixture of 1354 grams (14.305 carboxyl equivalent weights) of azelaic acid, 679 grams (13.039 hydroxyl equivalent weights) of neopentyl glycol, and 1.24 grams (0.012 equivalent) of potassium acetate was charged to a 3-liter 3-neck flask and the reaction run with stirring under nitrogen. The water of esterification was removed through a steam-jacketed, packed column. Toluene was added to form an azeotrope, which was removed with an aspirator; the last traces of water were removed by applying a vacuum (0.05 mm. mercury pressure while the mixture was at 156° C.). An acid number of 45.6 was measured, which corresponded to a carboxyl equivalent weight of 1230 versus the equivalent weight of 1420 that should theoretically have been obtained. The hydroxyl number was 5 and the viscosity was 27,000 cps. at 24° C.

To 1626.9 grams (1.3227 carboxyl-equivalent weight) of the carboxyl-terminated polyneopentyl azelate, 351.9 grams (2.6459 epoxide equivalent weights) of 1,4 butanediol diepoxide was added. The reaction was performed under nitrogen at a temperature of 150° C. After 2½ hours the acid number was 0.1. The epoxide equivalent weight was 1472 versus a theoretically obtainable 1496. The viscosity was 52,000 cps. at 24° C.

This epoxy-terminated polyester was used with the epoxy-terminated polyester of Example 1 according to the following formulation:

| | Parts |
|---|---|
| Epoxy-terminated polyester of Example 1 | 50 |
| Epoxy-terminated polyester of Example 7 | 50 |
| Trimellitic acid | 5.1 |
| Bentone 38 | 10 |
| Mapico Red | 1.5 |

The mixture was mixed in a metal container with a spatula and further mixed by running through a three-roll paint mill. The paste-like product was scraped off into a container and cooled by circulating air.

The product upon application and curing for 1 hour at 200° C. was a tough, rubbery resin and exhibited similar physical properties as did the resin system of Example 1.

I claim:

1. A one-part long-shelf-life resin composition that is rapidly curable to a strong, tough, heat- and chemical-resistant and flexible state comprising
   (A) the substantially completely reacted adduct of
      (1) an acid-terminated polymer having the formula

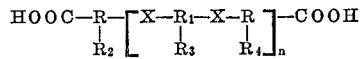

in which X is an ester group; R and $R_1$ are selected from hydrocarbon groups, hydrocarbon groups having ether linkages, and hydrocarbon groups substituted with sulfone, sulfide, phosphonate, phosphine oxide, silane, and siloxane groups, and combinations of them; $R_2$ is selected from hydrocarbon groups, carboxyl, hydrogen and halogen, and combinations of them; $R_3$ is selected from hydrocarbon groups, hydrogen, halogen and X—R—COOH groups (where X and R have the above assigned designations), and combinations of them; and $R_4$ is selected from hydrocarbon groups, hydrogen, and halogen, and combinations of them; and $n$ is at least one;

(2) an epoxy compound containing on the average at least 1.3 oxirane groups per molecule, said epoxy compound being present in the amount of at least two epoxide equivalent weights for each carboxyl equivalent weight of acid-terminated polymer present; and
   (B) a hardening agent selected from a group consisting of aromatic and cyclic polycarboxylic acids that have at least three functional acid groups and have a melting point above at least 125° C.

2. A composition as recited in claim 1 wherein said aromatic polycarboxylic acid is pyromellitic acid.

3. A composition as recited in claim 1 wherein said aromatic polycarboxylic acid is benzophenone tetracarboxylic acid.

4. A composition as recited in claim 1 wherein said aromatic polycarboxylic acid is trimellitic acid.

5. A composition as recited in claim 1 wherein said aromatic polycarboxylic acid is trimesic acid.

6. A composition as recited in claim 1 wherein said cyclic polycarboxylic acid is 1,2,3,4-cyclopentane tetracarboxylic acid.

7. Electrically conductive wire encased in a thin layer of a cured composition of claim 1.

8. A flexible self-supporting thin strip comprising the cured composition of claim 1.

9. A dipping composition curable to a strong, tough, chemical- and heat-resistant flexible state comprising a composition of claim 1.

10. A composition as recited in claim 1 that further includes a thixotropic filler.

References Cited

UNITED STATES PATENTS

| | | | |
|---|---|---|---|
| 2,712,535 | 7/1955 | Fisch | 260—835 |
| 3,027,279 | 3/1962 | Kurka et al. | 260—835 |
| 3,408,421 | 10/1968 | Kurka | 260—835 |

SAMUEL H. BLECH, Primary Examiner

U.S. Cl. X.R.

117—232; 260—22, 40, 835